United States Patent [19]

Spaargaren

[11] 4,024,506
[45] May 17, 1977

[54] CONTROL DEVICE FOR A MATRIX PRINTER

[75] Inventor: Hans Spaargaren, Rijswijk, Netherlands

[73] Assignee: U.S. Philips Corporation, New York, N.Y.

[22] Filed: Mar. 5, 1975

[21] Appl. No.: 555,581

[30] Foreign Application Priority Data

Mar. 8, 1974 Netherlands ............... 7403130

[52] U.S. Cl. .................... 340/172.5; 101/93.04
[51] Int. Cl.$^2$ ........................ G06F 3/12
[58] Field of Search ............ 340/172.5; 197/1; 101/93.04, 93.05, 93.37; 235/151

[56] References Cited
UNITED STATES PATENTS

| | | | |
|---|---|---|---|
| 3,174,427 | 3/1965 | Taylor | 101/93.04 |
| 3,192,854 | 7/1965 | Martin | 101/93.04 |
| 3,634,828 | 1/1972 | Wethersfield | 340/172.5 |
| 3,872,444 | 3/1975 | Cleveland et al. | 340/172.5 |
| 3,893,558 | 7/1975 | Fulton et al. | 101/93.05 |

Primary Examiner—Joseph F. Ruggiero
Attorney, Agent, or Firm—Frank R. Trifari; Daniel R. McGlynn

[57] ABSTRACT

A control device for a printer of matrix type, in which the recording elements are moved along a recording sheet by means of a movable member. The recording elements are arranged in groups of elements which have been staggered with respect to each other, and are actuated per row and per column. Devices which are provided in the present invention include a starting position device, for storing a position code which represents an extreme position of the movable member; an address counter; a buffer store; a character generator; and a row counter and column counter.

5 Claims, 10 Drawing Figures

| PRC | AC | RC | CC | Ni | PSR | | |
|-----|-----|----|----|----|-----|---|---|
| –   | –   | –  | –  | –  | 1   | | LEL |
| 232 | 232 | 1  | 1  | 1  | 2   | → SRF | |
| 232 | 235 | 2  | 1  | 2  | 3   | | |
| 232 | 238 | 3  | 1  | 3  | 4   | | |
| 232 | 253 | 8  | 1  | 8  | 9   | | |
| 232 | 0   | 9  | 1  | 9  | 10  | | |
| 232 | 3   | 1  | 1  | 10 | 11  | | |
| 232 | 27  | 9  | 1  | 18 | 19  | RF | c.RF=14.RF |
| 232 | 108 | 9  | 1  | 45 | 46  | | |
| 232 | 111 | 1  | 1  | 46 | 47  | | |
| 232 | 135 | 9  | 1  | 54 | (1) | | |
| 232 | 232 | 1  | 2  | 1  | 2   | | |
| 232 | 235 | 2  | 2  | 2  | 3   | RF | |
| 232 | 135 | 9  | 2  | 54 | (1) | | |
| 232 | 135 | 9  | 11 | 54 | (1) | | s.r.c.RF= 378 RF |
| 233 | 233 | 1  | 12 | 1  | 2   | | |
| 233 | 236 | 2  | 12 | 2  | 3   | | |
| 233 | 136 | 9  | 14 | 54 | (1) | | |
| 233 | 233 | 1  | 1  | 1  | 2   | | |
| 233 | 236 | 2  | 1  | 2  | 3   | RF | c.RF=14.RF |
| 233 | 136 | 9  | 1  | 54 | (1) | | |
| 234 | 137 | 9  | 14 | 54 | (1) | | |
| 255 | 159 | 9  | 14 | 54 | (1) | | |
| 0   | 0   | 1  | 1  | 1  | 2   | | |
| 2   | 2   | 1  | 1  | 1  | 2   | | |
| 2   | 161 | 9  | 11 | 54 | (1) | | |
| 3   | 3   | 1  | 12 | 1  | 2   | | |
| 3   | 162 | 9  | 14 | 54 | (1) | | LER |

CONTROL DEVICE FOR A MATRIX PRINTER

The invention relates to a control device for actuating recording elements in a recording device for recording characters composed of point-shaped or line-shaped elements, the recording device comprising a member which is reciprocatable in the line direction in front of a recording sheet and whereby the recording elements can apply the point-shaped or line-shaped elements of the characters to be recorded on the recording sheet, the recording elements, being arranged at a mutually equal distance of $s$ characters from each other and forming at least one group of $r$ recording elements, at least the ends of which are situated on one line which encloses an acute angle with the line direction. A recording device comprising the said reciprocatable member, in which the recording elements form at least one group, and in which the ends of the recording elements are situated on one line which encloses an acute angle with the printing line direction, is already known in the art. The recording elements may comprise short, parallel arranged needles which are driven by electromagnetic drive members which are arranged on the reciprocatable member. Other set-ups are also possible, in which the recording elements are, for example, comparatively long, flexible needles. These needles are guided in the movable member only near their end which faces the record carrier and are driven by stationary drive members. The said recording elements can also comprise electrodes which cooperate with a counter-electrode arranged behind the record carrier in order to form an electrostatic charge image on the record carrier. Further set-ups are also feasible, in which the recording elements are electrodes which are arranged on the movable member and which serve, for example, for thermal recording of point-shaped or line-shaped elements of characters to be recorded. The above, non-limitative summary was given to indicate that the control device according to the invention is suitable for all kinds of recording devices of the kind set forth.

For a proper understanding of the invention, first the general set-up of the recording device and the associated so-termed control formula will be described.

For this purpose, and for the purpose of subsequently describing the invention with reference to an embodiment of a control device according to the invention, this description is accompanied by the following figures.

Figure 1:
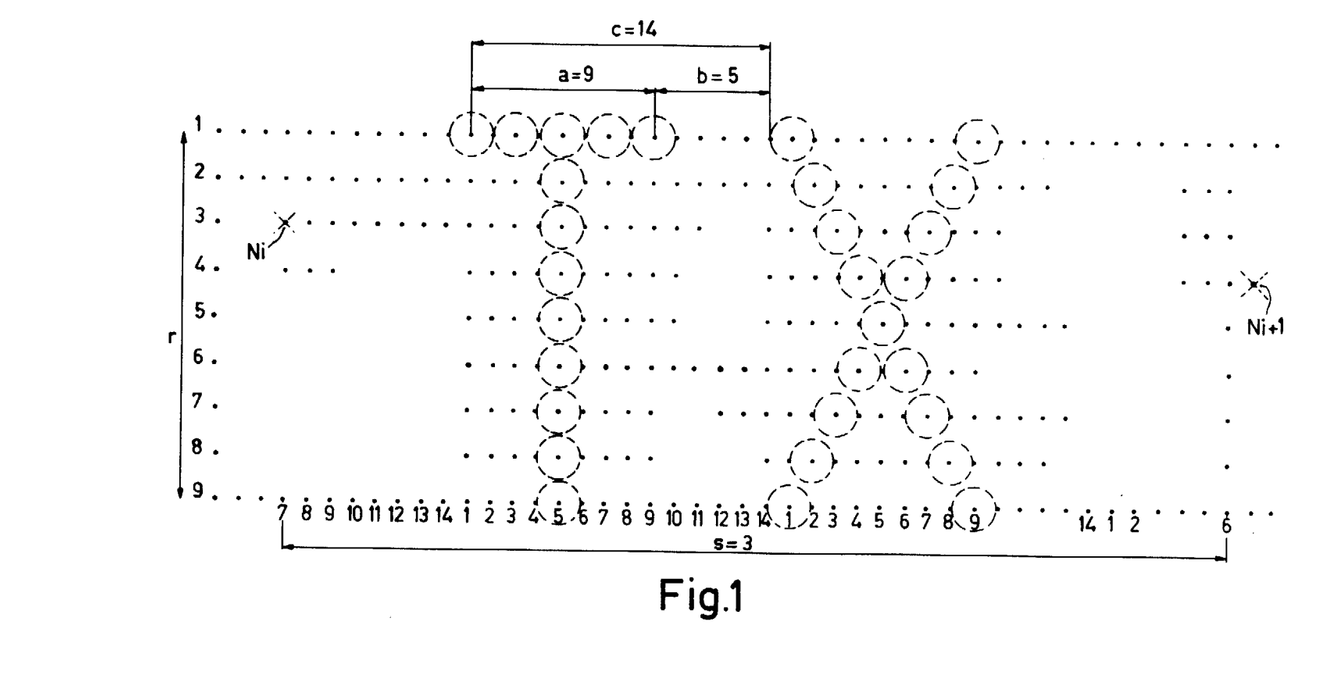
FIG. 1 shows a part of a line recorded on a recording sheet.

FIG. 1 shows a part of a recorded line. The height of a line is determined by the number of rows $r$ constituting a character. In this case $r = 9$. In the line direction a character has a width of $c$ point or line elements (referred to hereinafter as "dots" for the sake of simplicity). In this case $c = 14$. The width of $c$ dots normally consists of a portion $a = 9$ dots in which a character to be recorded (digit, letter, etc.) fits, whilst a part $b = 5$ dots serves for the spacing between two characters. For the purpose of illustration, the character T is shown to indicate how the largest height $r$ and the largest width $a$ can be utilized. Also shown in FIG. 1 is the character to illustrate the appearance of slanted lines on the character matrix. Because in this example the dots of the character matrix are spaced twice as far apart in the heighth direction, than in the width direction, a smooth inclined-line image is obtained. Finally, FIG. 1 also shows how recording elements of the movable member can be situated with respect to a line on a recording sheet. Ni and Ni + 1 are projections of two successive recording elements of a group of recording elements of the member. In the vertical direction, the elements are arranged to be shifted over one row with respect to each other. In the line direction the elements are arranged to be shifted over a distance $s$, equalling 3 character locations in this example, with respect to each other ($s = 3$).

Figure 2:
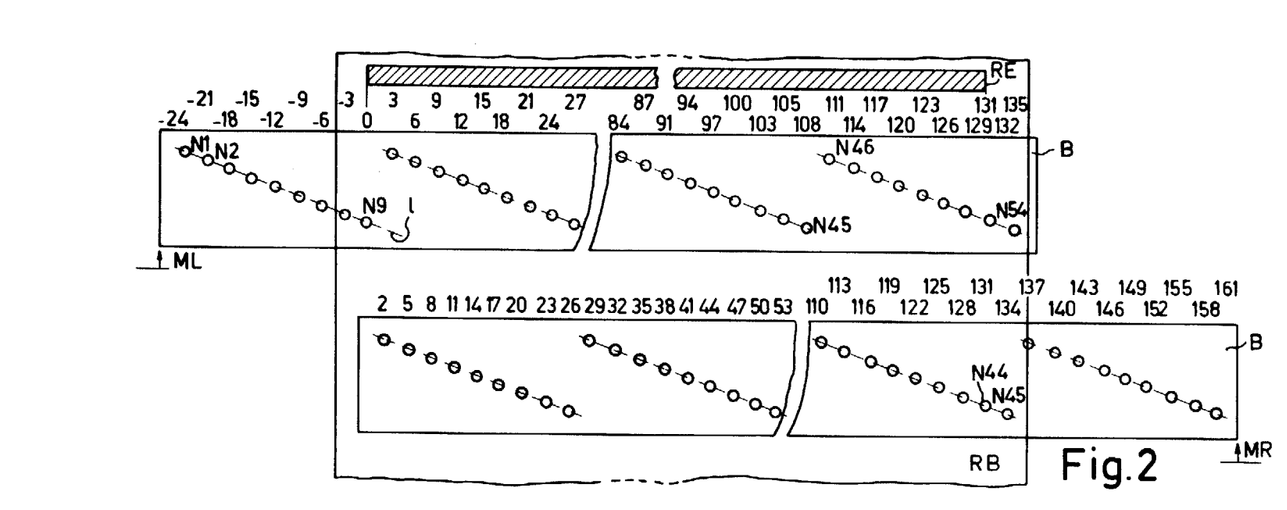
FIG. 2 shows the movable member in one and in an other extreme position.

The upper half of FIG. 2 shows the movable member B in one extreme position ML (left), while the lower half shows the member in the other extreme position MR (right). The recording sheet is diagrammatically shown and is denoted by RB. The bar RE denotes the full line width. The member B in this example comprises the recording elements N1, N2, . . . N54. Thus, 54 elements are present which are divided into 6 groups of 9 elements. In this example the full line width covers the characters K=0, 1, 2, 3, . . . 131. The recording elements are arranged, as already stated, at a distance of $s = 3$ characters from each other in the line direction. The 9 recording elements of a group are situated on a line 1 which encloses an acute angle with the printing line direction. It was already stated that a line is composed of $r = 9$ rows: each recording element of a group of $r = 9$ elements coincides with a relevant row of the line (see also FIG. 3). In the one extreme position ML, the member B partly projects further than the left-hand edge of the sheet RB. In order to enable all characters of a line to be recorded in only one movement of the member B from position ML to position MR, the set-up should be such that all possible recording points of a line are passed by a recording element. Assuming a given number of recording elements N1, N2, . . . N54, in conjunction with the above parameters $s$ and $r$ and the number of characters, 0, 1, 2, 3, . . . 131 per line, a choice can be made as regards the positions of the recording elements in the one and in the other extreme position of member B. In the example of FIG. 2, the choice is such that in the position ML the recording element N9 is exactly at the position of the $0^{th}$ character of the line (in this position ML, this element is then, moreover, at the area of the $1^{st}$ column of the $0^{th}$ character). The situation is further laid down by $s = 3$ and $r = 9$. The recording elements N8, N7, . . . N1 are then opposite the positions of the fictitious characters −3, −6, . . . −24. Proceeding to the right along the member B, each of the recording elements is situated opposite a character position. For example, N46 is opposite character 111, N54 is opposite character position 135 etc. A line comprises only 0–131 = 132 character positions, so recording element N54 and also the element N53 (opposite character position 132) can actually be dispensed with.

When the member B moves to the right, first the first, second etc. up to the 14$^{th}$ column of the above character positions are passed, after which a next sequence of character positions (one further, so element N1 opposite −23, N2 opposite −20, . . . N9 opposite 1, . . . N54 opposite 136) is reached. In this manner all character positions 0–131 are passed during the movement to the position MR. In position MR, recording element N1 is opposite character position 2 (and in this extreme position also at the area of the last column $c = 14$), N45 is opposite fictitious character position 134, etc., N54 is opposite character position 161. Considering the foregoing, it will be obvious that, when the member B moves from the right (MR) to the left (ML), all character positions 0–131 are completely passed again, with the result that, if adequate control is provided for this purpose, a complete line of characters can again be recorded during this return movement of the member B. When a new line is recorded, the sheet will have been transported to a next line position.

For the described set-up, other starting situations can also be chosen. For example, assuming 54 recording elements, in position ML the recording element N54 may be opposite the position of the character 129. N46 is then opposite character position 105, N9 is opposite −6, etc. In the position MR, N54 is then opposite character position 155. N46 has then just reached character position 131. N1 is then meanwhile opposite character position −4. All possible recording points of a line have thus been passed again. Actually, the recording elements N1 and N2 can then be dispensed with. For the given parameter values, between the described cases there can still be the situation in which in position ML recording element N53 is opposite character position 129, etc. In the case of other values of the parameters $s$, $r$ and number of characters K on a line, similar set-ups can be chosen.

FIG. 3 again shows the situation in which the one extreme position (ML) of the member B is taken as the starting point (see upper half FIG. 2). This position is the so-termed mechanical (member B) position MPO. During a movement from ML to MR (and also during the return movement) a stroke $S = s, r$. is made. In this example, this stroke S covers $3.9 = 27$ character positions, or the positions MPi MP0, MP1, . . . MP26) of the member B. In each of these positions, a given character number is associated with each of the recording elements. The relationship between these factors can be given by a simple formula: $K = MPi + s (Nn − Nn0)$. $i$ extends from 0 to $s.r.−1$ inclusive, and $n$ extends from 1 to the number of the last recording element. Furthermore, n0 denotes the number of the recording element which is opposite the position of the $0^{th}$ character in the extreme position ML.

Figure 3:
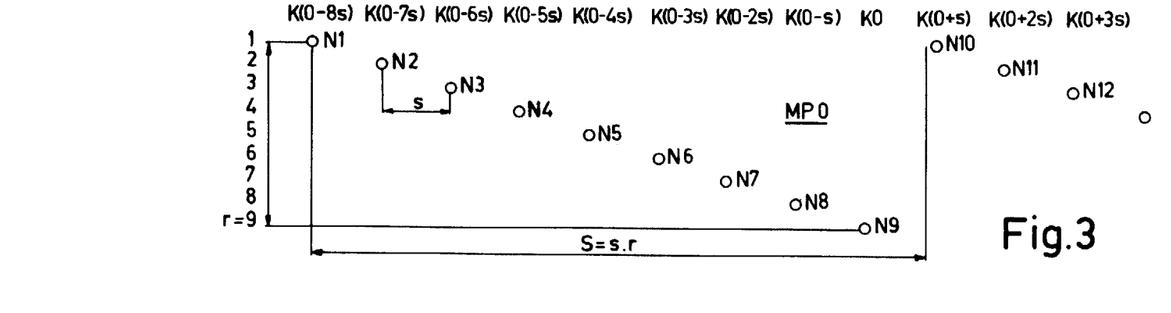
FIG. 3 shows a separate group of recording elements and a number of notations.

The foregoing can be readily deduced from the mechanically given construction of the recording device. For controlling the device, the given formula can then be readily used. This is because the character which is to be applied, in a given position of the movable member, to a given recording element so as to be recorded (i.e. one dot thereof) is given by the formula. Therefore: in position MPi = 2, the character $K = 2 + 3 (12−9) = 11$ must be applied for recording element Nn = 12, in the case of a starting position in position ML as given in FIG. 2, so $Nn0 = 9$. It is known for each of the recording elements which row of a line is served thereby: $Nn = 12$ serves row number 3 (FIG. 3). Depending on the column position within a character position, it can thus be determined whether or not a character dot is to be applied to the recording element.

The problem which occurs in practice is the question how the given formula $K = MPi + s(Nn−Nn0)$ is to be applied. The most obvious solution is a logic adding and multiplication method. For a logic specialist it is no problem whatsoever to find the associated value of K for each value of $i$ and $n$. The formula can be worked out, so to speak, each time by means of a simple calculator. However, this procedure has drawbacks which prevent the realization of an optimum design of the control of the said recording device. Firstly, there is a requirement as regards speed: is the recording speed is limited in practice by the mechanical restrictions; it is not permissible to have the recording speed restricted by an insufficiently efficient processing of the said formula. However, this requires fast logics which render the adding and multiplication so complex that the cost of control become too high.

The object of the invention is to mitigate the described drawbacks. According to the invention, no direct use is made of the formula, but a deliberate use is made of the mechanical constellation of the recording device so as to obtain a very fast control device which is simple per se. To this end, the control device according to the invention is characterized in that it comprises:

measuring for supplying signals which indicate the movement direction and the positions of the movable member a buffer store for the storage of at least as many characters as there are to be recorded on the recording sheet during a movement (forward or return)

addressing means for the buffer store which can be preset by a starting position device a character generator for supplying point or line element information of characters to be recorded a row counter having a counting capacity $r$ for addressing the separate rows of point elements or line elements constituting the characters in the character generator a column counter having a counting capacity $c$ for addressing the separate columns constituting the characters in the character generator a point or line element information register in which per recording element the point or line element information can be stored, and whereby the recording elements can be actuated in reaction to a control pulse (recording action) there furthermore being provided:

first means which, in the one extreme position of the movable member, supply the starting position device with an address code which corresponds to an address which indicates the number of character positions whereby the first recording element precedes, viewed from the said one extreme position, the address of the buffer store in which in the buffer store the first ($0^{th}$) character to be recorded on a line is stored second means whereby an address code can be transferred from the starting position device to the addressing means of the buffer store third means for setting the row counter to a starting position, in the said extreme position, and for increasing the position of the circulating row counter by 1 each time, in total as many times as there are actuatable recording elements, after which a recording action can be performed (sub-calculation phases), these third means furthermore being provided for increasing, simultaneously with the increasing of the position of the row counter, the position of the addressing means for the store by each time a value of $s$ addressing units, and for setting the column counter, in said extreme position, to a starting position, and for increasing the position of the column counter by 1 each time a recording action has been performed, in total a number of times equalling the counting capacity $c$ of the column counter (calculation phases)

fourth means for increasing the position of the starting position device by one address unit, each time in one of the positions of the column counter which corresponds to a column number in the space portion of a character, in total as many times as there are characters ($s.r$) which are passed during the movement of the movable member from the said one extreme position to the other extreme position ($s.r.c.$ calculation phases).

Using the described recording device, recording actions can be performed during the movement of the movable member in the one as well as in the other direction. When there is intermediate paper supply (or when if there is a continuous paper flow, in the case of sufficient flow during the changeover of the movement from the one direction to the other), complete lines can thus be recorded during the forward as well as during the return movement of the movable member. In order to control this, utilizing the described control device, the control device according to a further aspect of the invention furthermore comprises:

fifth means which, in the other extreme position of the movable member, supply the starting position device with an address code which corresponds to an address which indicates the number of character positions the last recording element, viewed from the said other extreme position, is situated from the address of the buffer store at which the first ($0^{th}$) character to be recorded on a line is stored in the buffer store sixth means to ensure that, in the said other extreme position of the movable member, the column counter is in the highest position $c$, and that after each recording action the column counter code can be reduced by 1 seventh means for decreasing the position of the starting position device by one address unit, each time in one of the positions of the column counter which corresponds to a column number in the space portion of a character, in total as many times as there are characters which are passed during the movement of the movable member from the said other extreme position to the one extreme position.

A further extension of the control device according to the invention consists in that the point-element or line-element information register is a shift register having parallel outputs and a serial input and output, a gate being provided whereby a flag signal can be applied to the input of the shift register before the first point-element or line-element information appears on the output of the character generator, a calculation phase being stopped when the flag appears on the serial output of the shift register. A very simple time check has thus been realized: the shift register simultaneously serves for counting down the number of recording elements.

The control device according to the invention will be described in detail hereinafter with reference to an elaborated embodiment.

Figure 4:
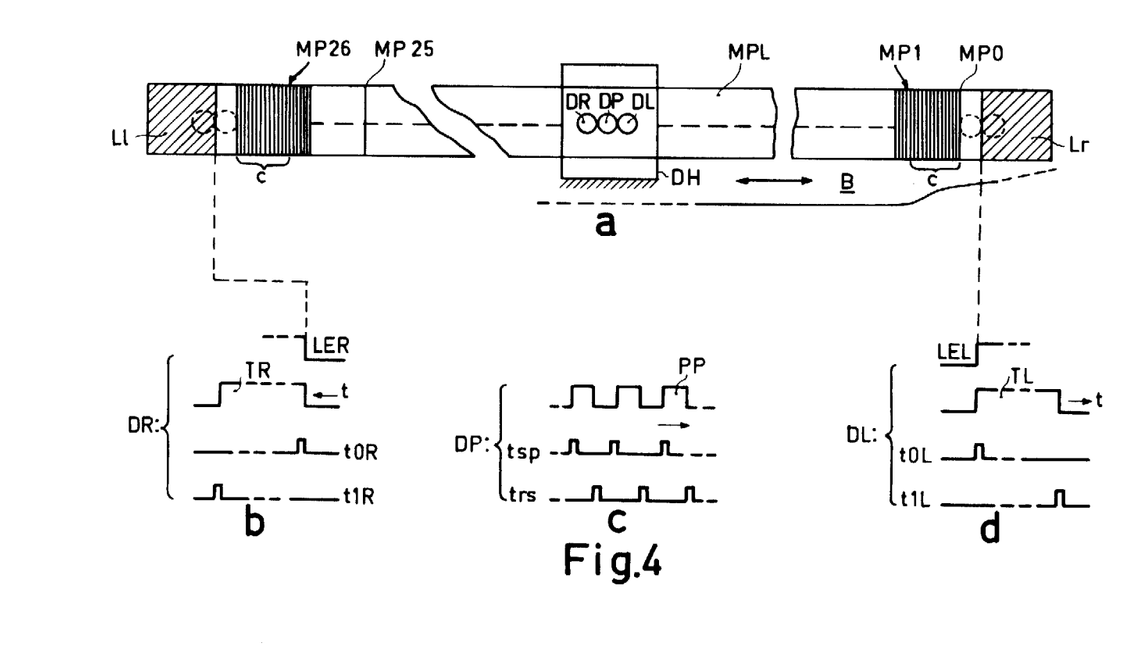
FIG. 4 shows a mechanical position ruler and some signal notations.

FIG. 4 shows how the connection between mechanics and control can be realized. MPL is a position ruler mounted on the movable member B. On the ruler position strokes MP0, MP1, . . . MP26 are provided, and therebetween $c-1 =]13$ strokes are provided. Consequently, per position MPi there are $c = 14$ strokes: one for each column of a character. To the right of the ruler MPL there is a portion L1 which is completely black. Similarly, to the left there is a portion L1 which is also black. Furthermore, there is provided a photocell detector holder DH which is mounted on the body of the recording device (not shown).

In this embodiment there are provided three photocells DR, DP and DL which pick up signals originating from light transmitted through the ruler MPL. It is useful, for example, to mount the portion Lr on the other side (for example, underneath) the ruler. In that case detector DL should also be mounted on the other side of DH (also underneath). This should be done to prevent mix-ups between the detection for the left and the right of the ruler. For the invention it is important that the following signals (also shown in FIG. 4) are derived from the ruler by the detectors: detector DP supplies a position pulse PP each time it passes a stroke on the ruler. The leading edges produce pulses tsp and the trailing edges supply pulses trs (to be described hereinafter). When the member B arrives in the one extreme position, the left-hand portion of Lr passes the detector DL; this indicates that the extreme position has been reached; line-end-left LEL (compare position ML of FIG. 2). Viewed in time, this produces a signal TL which ceases at the instant at which the member B passes the boundary of portion Lr again during its movement in the other direction (going to the left in the drawing). A signal t0L is derived from the leading edge of TL, and a signal t1L is derived from the trailing edge. The same takes place when the member B in the other extreme position allows the portion L1 to pass over the detector DR: line-end-right LER (compare position MR of FIG. 2). The time pulse TR, supplied as long as L1 is in the range of DL, is also used to derive signals from: t0R ("going into" portion L1) and t1R ("leaving" portion L1). The signal data required for the control device according to the invention are thus available. During the above signals TL and TR, the control of the movable members is also active: after t0L and t0R the movable member decelerates, stops, reverses its direction and accelerates again. After t1L and t1R, the correct speed is reached again.

Figure 5:
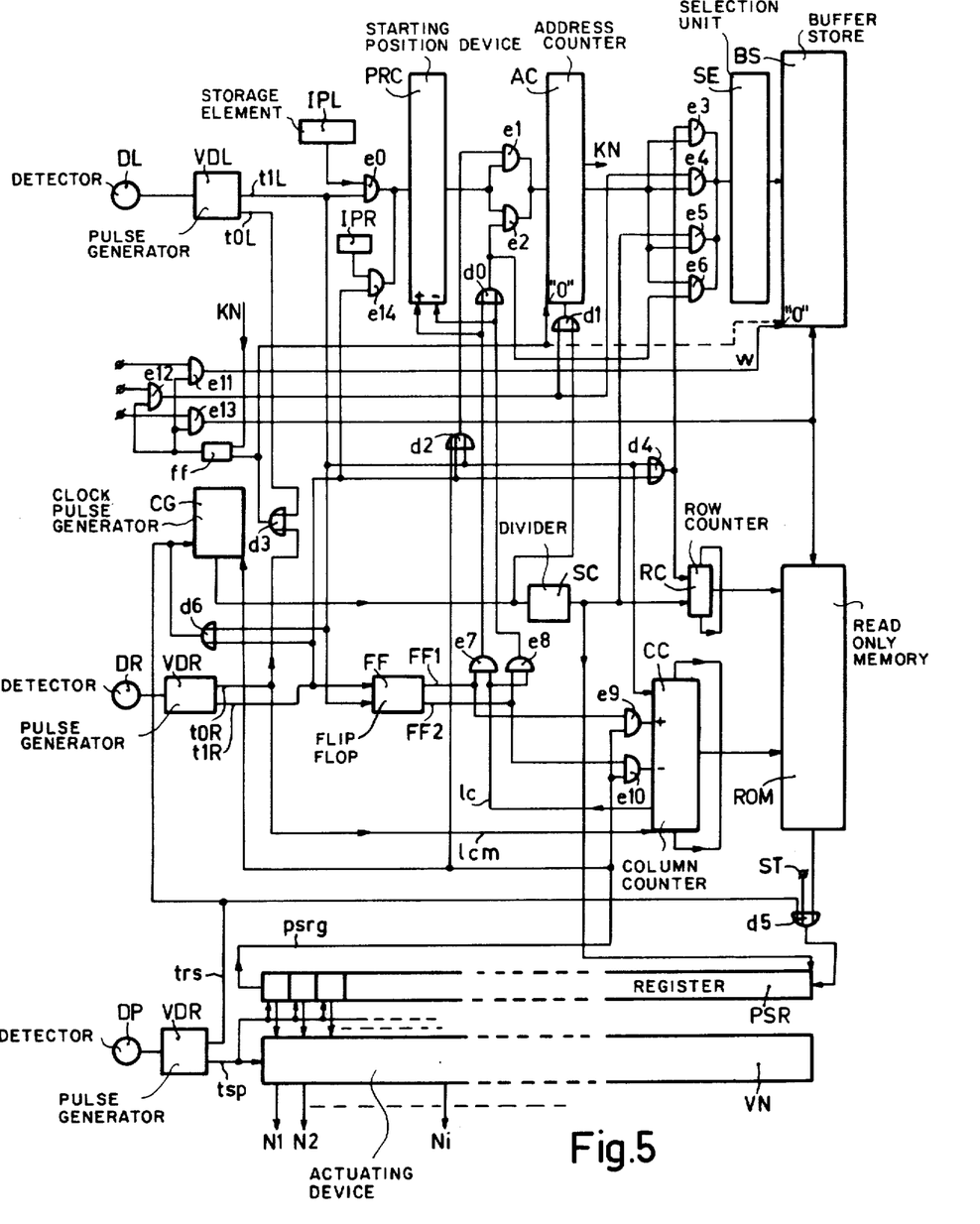
FIG. 5 shows an embodiment of a control device according to the invention.

FIG. 5 shows an elaborated embodiment of the control device according to the invention. The detectors DL, DR and DP shown in FIG. 4 are also shown in FIG. 5. Each detector is followed by pulse generator: VDL, VDR and VDP, respectively. On the output thereof, the already described signals t0L, t1L, t0R, t1R, trs and tsp appear. In FIG. 5 the lines carrying these signals are denoted by the same references. Starting position storage element IPL constitutes, in conjunction with AND-function gate eo, first means which, in the one extreme position line-end-left LEL (see FIG. 4) of the movable member, apply an address code to the starting position device, denoted by PRC, at the constant t1L, the said address code corresponding to an address which indicates the number of character positions that the first recording element is situated, viewed from said position LEL, before the address of the buffer store BS at which the $0^{th}$ character to be recorded on a line is situated in the buffer store BS. In this embodiment it is assumed that the number of character positions is 24. This is the situation as shown in the example of FIG. 3 (upper half). The address code then represents the number −24, because it is situated ahead of the $0^{th}$ character position (to the left). The AND-function gates e1, e2, e3, e5 and e6 constitute, in conjunction with OR-function gates d2 and d4, second means whereby each time an address code present in PRC can be transferred to the address counter denoted by AC, the contents of the latter being transferred again to the selection unit SE of the buffer store BS. In conjunction with SE, AC constitutes the addressing means of the buffer store BS. In BS at least the contents of the characters of a line to be recorded can be stored. In this example the capacity of BS is 132 characters, i.e., stored at addresses 0 to 131. Third means are formed by a line t1L via which a row counter RC is set to a starting position via gate d4. In this example this starting position is assumed to be 1. This corresponds to row 1 of a line. Further third means are formed by a clock pulse generator CG and a divider SC. The clock pulse generator CG supplies, after having been started via its starting input by line trs or OR-function gate d6, pulses to row counter RC via the divider SC. RC thus advances until the capacity $r = 9$ ( in this example) is reached. RC is looped, and subsequently starts at its starting position 1 again, etc. There is also provided a column counter CC which can be set to a starting position also via line t1L. $c = 1$ is again assumed to be the starting position. CC is also a circulating counter. Via AND-function gates e9 and e10, CC can be controlled by a flip-flop FF. e9 controls the forward counting of CC, co $c = 1, 2, \ldots$, while e10 controls the counting down of CC, so $c = \ldots 6, 5, 4, \ldots$ This can be effected by the reversal of the counting direction itself, or by inverting the outputs of the counter CC. The counting pulses for counter CC originate from a register PSR via line psrg (see below). The capacity of CC is $c = 14$ in this example (on the basis of the data of FIG. 1). Therefore, on its output the counter supplies the codes $1, 2, \ldots 14, 1, 2, \ldots$, or the codes $14, 13 \ldots 1, 14, 13, \ldots$ The codes of RC and CC are used, together with the character code stored in the buffer store BS, for addressing a character generator ROM. ROM is a read-only store in which the dot information of each character to be possibly recorded is stored. If a character code covers 6 bits, $2^6 = 64$ different characters are feasible. If there is dot information, i.e. if a dot is to be recorded, a 1-signal is present, and if no dot is to be recorded, a 0 signal is present on the output of ROM. Via an OR-function gate d5, this dot information is shifted into a dot information register PSR. In PSR the information is shifted further in reaction to each pulse which arrives from the unit SC (and which also goes to RC). In reaction to a time pulse tsp from VDP, the parallel outputs of the register PSR are connected to the inputs of the recording element actuation device VN. One input is provided for each receiving element. In the present example, PSR comprises 54 positions and there are 54 inputs of VN. VN comprises the same member of outputs which control the 54 recording elements. From clock pulse generator CG, the address counter AC is provided with counting pulses via OR-function gate d1 which also forms part of the so-termed third means. The arrangement is such that each time when $s$ counting pulses (in this example $s = 3$) have been applied to AC, only 1 counting pulse is applied to the row counter RC. Divider SC thus divides by the factor $s$. This is determined by the fact that the recording elements are staggered over 1 row every $s$ characters. Fourth means, formed by a line 1c, AND-function gate e7 and a raise input of PRC, denoted by +, ensure that each time in reaction to one of the positions of the column counter CC, which corresponds to a column number in the space portion of a character, for example, in this case $c = 12$, the position of the starting position device PRC is increased by 1 address unit. Normally this could be effected at the position $c = 14$, but for the synchronization of the entire device, it is better to effect this sooner in view of the time required for preparing the next calculation phase. It must take place in the space, because otherwise incorrect characters will be produced.

In this embodiment recording can also take place during the movement of the movable member in the other direction. To this end, additional means are provided: fifth means, formed by a further starting position storage element IPR and an AND-function gate e14, which apply, in the other extreme position, line-end-right LER, of the movable member, an address code to the starting position device PRC at the instant t1R, the said code corresponding to the address which indicates the number of character positions that the last recording element is situated, viewed from the other extreme position (LER), from the address of the buffer store BS at which the $0^{th}$ character to be recorded on a line is stored in the buffer store. In this example, the address code would be 2. However, because PRC changes its position each time at the column counter position $c = 12$, and not at its maximum position $c = 14$, the address code must be 3. The address code then becomes 2 during the counting down of the counter CC; $c = 14, 13, 12, \ldots$, sp at the position $c = 12$. There are also provided sixth means: line t0R and the AND-function gate e10 which can be controlled by flip-flop FF and which controls the count-down input of the counter CC, so that in the position LER the column counter CC is brought to its highest position $c = 14$ (or is maintained therein, depending on what happened previously), via line 1 cm, and by means of which the column counter position can each time be decreased by 1. Finally, there are provided seventh means which are formed by line 1c, AND-function gate e8 and a decrease input of PRC, denoted by −, which ensure that each time in one of the positions of the column counter CC, corresponding to a column member in the space portion of a character, so in this case $c = 12$, the position of PRC is decreased by 1 address unit.

The dot information register PSR is a shift register having a serial input and also a serial output. The following is then possible: via an OR-function gate d5, a flag bit, preceding a first dot information bit, ca be placed in the register. During the supply of pulses by SC, the information in PSR each time advances one position. When 54 shift pulses have been applied, the flag bit will have passed completely through PSR and appears on the serial output. Via line psrg, the flag bit is used to indicate that a calculation phase has been completed (further elaborated hereinafter). In order to complete the device, it is also shown how the buffer store BS can be filled, for example, by a data processing device (not shown). To this end, the flip-flop ff, controlled by OR-function gate d3, and AND-function gates e11, e12, e13 and e14 and line w are provided.

It is to be noted that in the described setup situations may occur where address codes are smaller than zero. As appeared from FIG. 2, in the position ML a negative relationship exists between a character position and the first 8 recording elements: N1 at −24, N2 at −21 etc. In order to enable operation without problems in practice, it is useful to have counting space available also for these negative code values: the counter AC which generates the addresses for SE, and hence also for BS, can have an overcapacity such that the negative values are also included. If BS comprises addresses 0 - 131 for the characters of a line, AC should have at least 0 - 131 = 132 positions, increased by the negative positions up to 24 inclusive, so 156 positions. This can be further extended by the additional recording elements which are also present in this embodiment and which reach as far as character position 161 in the other extreme position MR. In practice, however, these address codes beyond code 131 are not necessary. This means that AC can in total have 24 + 132 + 30 = 184 positions, at least 156 of which are required in practice in order to enable all necessary positions to be reached. Normally, a counter having a standard counting capacity of $2^8 = 256$ will be used for the counter AC. The counting positions are then 0 - 255. The address code −24 can then be adjusted by adjusting the code value 264−24 = 232 on AC. During counting, the counter value 0 is then also reached at address code 256 = 0. This means that at the correct counter position the address of the $0^{th}$ character is present for selection in the buffer store BS etc. The address codes between 131 and 231 thus remain further unused.

The capacity of BS should be at least 132 positions in order to be capable of taking up a complete line of characters. A higher capacity of BS does not impose problems: if AC supplies addresses beyond the address code 131, they can be neglected in so far as this addressing is concerned. In practice it is simple to fill the buffer store with space characters at the addresses beyond 131 in such a case, so that 0-bit information appears as dot information on the output of the location of the character generator ROM selected by these space characters. In practice, BS will have a capacity which, like that of AC, amounts to $2^8 = 256$. BS thus also comprises addresses 0 − 255.

Figure 6A:
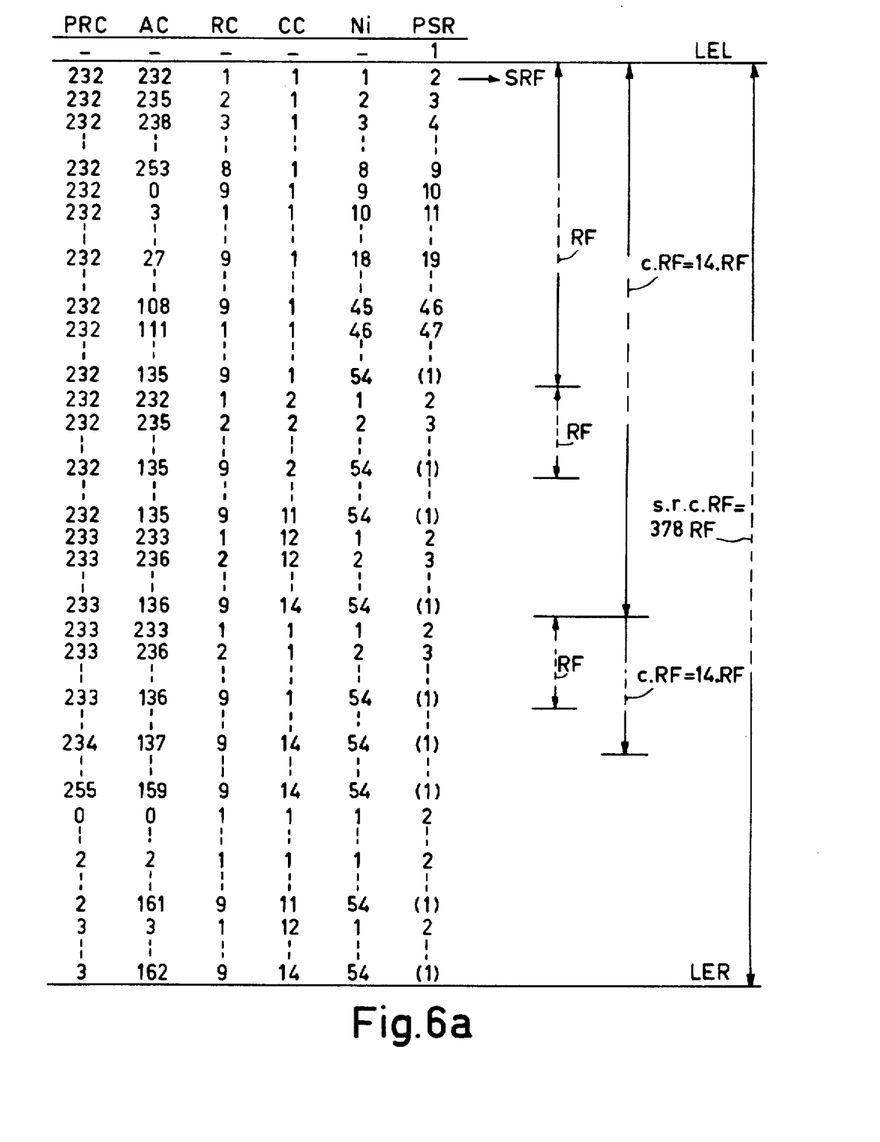
FIGS. 6a and 6b show a few important states during a number of subcalculation phases and calculation phases.
Figure 6B:
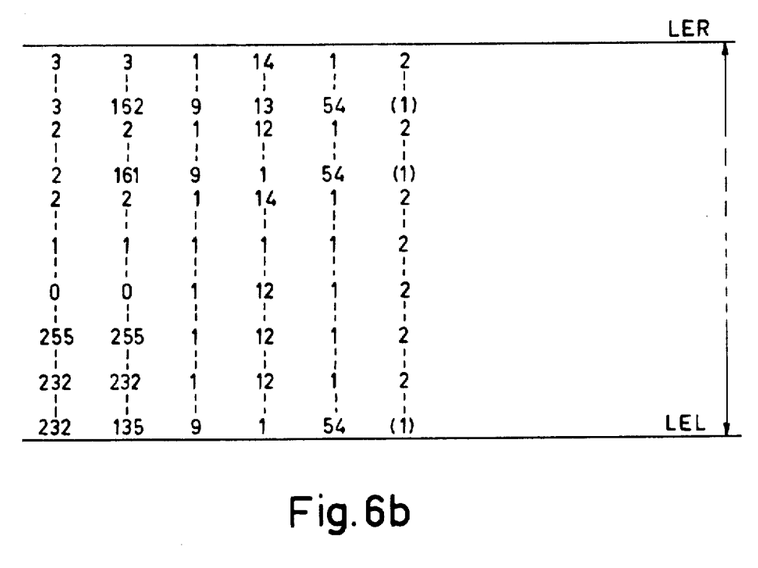

The operation of the control device will be described in steps hereinafter with reference to FIGS. 6a and 6b. Assume that BS has been filled: a line can be recorded. In locations where no character is to be recorded in a line, a space character is stored in BS. Furthermore assume that the one extreme position LEL (FIG. 4) is the starting situation. In reaction to the time pulse t1L, first the flip-flip FF is set. FF1 carries a 1-signal. The address code for this starting position LEL was −24, so in this case for address counter AC this means 0 −24, or: 256−24 = 232 as the address code. Therefore, the starting position device must assume the starting position 232 for this position. This takes place at the instant t1L; gate e0 opens and allows passage of the contents of IPL. IPL thus has to store the position 232 in its store. This position 232 is allowed to pass from PRC, via gate e1 which itself, is prepared via e2, to counter AC. From AC this position advances, via e3, to SE. Gate e3 is prepared by t1L via gate d4. In BS the character at address 232 is selected. At this address (> 131) no information is present, however, because the buffer BS is filled with space characters for the part exceeding the line length (0−131). Consequently, in the character generator ROM the location of a space character is selected. Alternatively, in the location > 131 of the buffer BS no or other information may be present. For addresses >131 always 0-dot bit signals must be applied to register BSR. This can be effected, for example, directly by the counter AC. The first row of the said character is selected by RC: RC is adjusted, by line t1L via gate d4, to the starting position, in this case row 1. Similarly, CC selects the first column of the space character: CC has been set to its starting position $c = 1$ via line t1L. The dot information for this (space) character has thus been fully selected. A 0-dot bit then appears on the output of ROM. Via d5, this bit arrives in register PSR. In PSR a 1 has already been introduced before this dot bit: this is the said flag bit. This is effected at a start by way of a signal ST applied to an input of OR-function gate d5. By way of t1L, the generator CG is started via OR-function gate d6. In this example, the following further occurs. Generator CG supplies pulses: via gate d1, the contents of counter AC are increased. After three pulses, SC supplies a pulse: e5 opens and allows passage of the new counting position of AC, i.e., 232 + 3 = 235, to SE. (If so required in view of speed, this increase of AC by $s = 3$ can also be effected in one operation by associating a simple adding device to AC which causes AC to make each times jumps of $s = 3$ address units. Divider SC can then be dispensed with). The (space) character present at this address in BS is transferred to ROM. In ROM selection takes place of this (space) character: RC has also been increased one step by SC: row number 2; furthermore, CC is still in its starting position $c = 1$. Therefore: row 2 of the column 1 of (space) character 235 is selected. The dot bit (0) thereof arrives in PSR via d5. The contents of register PSR are shifted one step further under the command of the pulse from SC. A cycle as described in above is referred to as the sub-calculation phase SRF (FIG. 6a). This cycle is each time repeated for a character which is situated $s = 3$ further down a line, and for an increased value on counter RC: after the second row, the third row etc. up to and including $r = 9$. Then again in position 1, 2, 3, ... This is repeated as many times as there are recording elements to be actuated (in this case 54). It appears from FIG. 6, in which each line represents a sub-calculation phase SRF, which counter positions have to be passed. In the columns, the positions of PRC, AC, RC and CC are shown. Furthermore, the number of the recording element Ni and the position of PSR are shown. After 54 steps, the dot information for each recording element is known. The flat bit appears on psrg. The counting position on column counter CC is thus increased by one: $c = 2$, via gate e9 which is prepared by the flip-flop FF (output FF1). RC is then automatically in the starting position 1 already (54/9 = 6 × circulation). Furthermore, the clock pulse source CG is stopped by psrg. This is the end of the first calculating phase RF. At this instant the gate e1 is opened via gate d2, so that the position of PRC is again passed to AC. The arrival of the movable member in the position in which the first column is situated, viewed from the one extreme position LEL, is indicated by the detector DP by way of the first pulse PP (FIG. 4) which originates from stroke MPO on ruler MPL. The leading edge pulse tsp then occurs: this pulse is used to control the recording action. tsp ensures that the contents of PSR actuate, via VN, all recording elements Ni for which a 1-dot bit was present in PSR. The trailing edge pulse trs announces the beginning of new calculating phase: trs starts the generator CG again, and at the same time moves the flag bit already to PSR via d5. The foregoing is the repeated: 54 subcalculating phases occur, in which now the dot bit information of the second column of the same characters (232, 235, . . . etc., see FIG. 6a), is determined. After 54 sub-calculating phases, the flag bit occurs again on psrg, and stopping takes place: AC back to position 232, RC again to position 1 and CC to position $c = 3$. This is repeated until at the end of a calculating phase CC reaches the position $c = 12$. On lines 1c this produces a signal by way of which the + input of PRC receives, via gate e7 which has been prepared by the flipflop FF, a command to advance one step: $232 \rightarrow 233$. This new position is passed, via AND-gate e2, prepared for this purpose via OR-function gate d0, to AC and further, via gate e6, to SE of the buffer store BS. The next calculating phase is thus started when a trs signal appears again from VDP. Calculations thus take place for characters which are all situated one character position further down the line. Because calculations still takes place in the space ($c = 12, 13, 14$), no 1-dot bits will appear. When $c=14$ becomes $c=1$ again, it is important that PRC has indeed been increased by one step: the columns of the preceding character have all been passed, and now the characters situated one character position further have to be treated, i.e. 233 instead of 232, . . . , 1 instead of 0, . . 136 instead of 135. The calculating phases are then repeated: CC is each time increased by one step etc. until $c=12$ again, and PRC is increased by one step etc. This is continued until all characters of a line have been completely treated. This is the case when the movable member has reached its other extreme position LER (see at bottom of FIG. 6a). The following then takes place: t0R appears, so that the flip-flop ff is set via OR-function gate d3. The gates e11, e12 and e13 are thus prepared. At the same time, t0R sets the counter AC to 0. If necessary, all information in BS can also be erased thereby (broken line). The device is thus prepared for a further external filling of the buffer store: the contents of a new line are written in BS; via e11, line w is excited and provides the write command in BS. Via e12, the counter AC is each time increased by 1 via gate d1, so that all addresses 0 – 131 are successively applied to SE. Simultaneously, the character information is applied to BS via e13. BS is filled until AC reaches the position KN = 131. KN resets flipflop ff, and the device is then ready for the recording of a next line. It is to be noted that it is alternatively possible to fill the buffer BS completely with space characters (for example, all 0-bits) after the recording of a line. Subsequently, new information can then be requested from the external source. This source then supplies at the most 132 characters. After the transfer of the correct number of characters (usually less than 132), a recording command is given by the source: the flipflop ff is reset. The buffer locations which have not been filled, have then already been filled with space characters. The operation then commences from the position LER: after t0R, also ensuring that counter CC has the position $c = 14$, t1R appears (the duration thereof is sufficient to fill BS; the mechanical reversal of the movement requires comparatively much time. Moreover, during this time the recording sheet must also be advanced one line). t1R causes the flipflop FF to change over: FF2 then carries a 1-signal which prepares the gates e8 and e10. As a result, PRC and CC will decrease their position (– inputs) when on CC $c=12$ appears and when psrg occurs at the end of each calculating phase RF, respectively. Via OR-function gate d6, t1R supplies the start signal for the clock pulse generator TG, and the calculating phases for this new line can commence. t1R opens gate e14 so as to pass the contents of IPR, i.e. position 3 (as already stated above, see also FIG. 6b), to PRC. Via d2, t1R also opens gate e1, with the result that the contents of PRC are transferred to AC. From AC, this position 3 is passed again, via d4 and e3, to SE. Moreover, via d4 the counter RC is set to the starting position 1. Via line 1cm, counter CC is set to its highest position $c=14$ (or is kept in this position, depending on what happened previously). The dot information for the first recording element N1 has thus been selected again in ROM, i.e. the information for a space bit; now the operation is performed in the character space, because during the movement from right to left, first column 14 is treated, and subsequently 13 . . . 2, 1, 14, 13, . . . This is shown in FIG. 6b. When all characters have been passed and treated again, LEL is reached once more and the signal t0L is given, via d3, to e11, e12 and e13 so as to fill the buffer store BS again with the contents of a new line. Like t0R, t0L can set the counter AC to 0 and erase BS. However, it is alternatively possible to effect this from an external source; this can be done by the information processing device supplying the characters. Consequently, in this example there are s.r.c.= $3.9.14 = 378$ calculating phases RF involved in the recording of each line.

Figure 7:
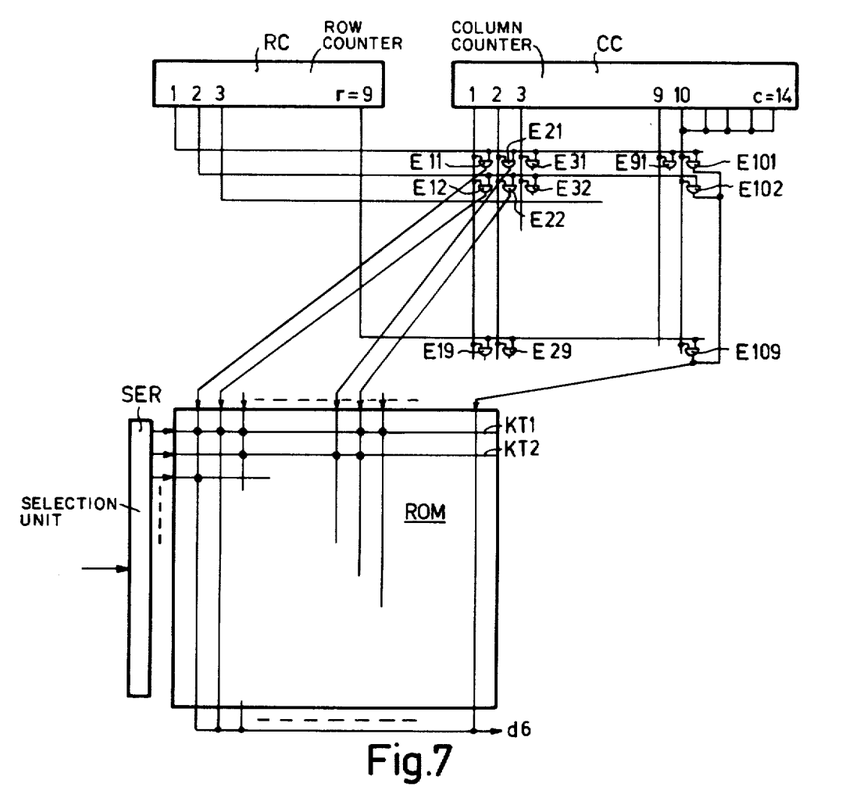
FIG. 7 shows an embodiment of a character generator.
Figure 8A:
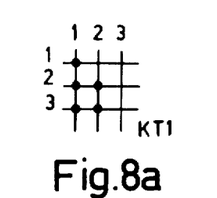
FIGS. 8a and 8b show character portions with dot bits.
Figure 8B:
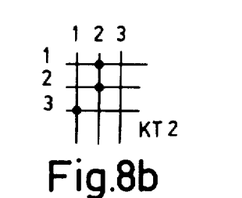

In order to complete the description of the control device according to the invention, a more detailed description will be given hereinafter of the character generator ROM which itself is not the subject of the invention. In the buffer store character codes of characters to be recorded are present. In ROM such a character code serves for the selection of a part in ROM which is reserved for the character associated with the relevant code. Depending on the construction of ROM, this may be, for example, an ROM bit group consisting of a number of bit locations which is equal to the number of dot positions of a character (FIG. 1). This may be r.c.=9.14=126, dots, so 126 bit positions in ROM. However, this number can be reduced: the dolumns $c=10, \ldots 14$ are space columns, and in principle a space bit (0) is only once required for this purpose, so, in ROM r.a.=1 + 9.9 =1 = 82 bit positions per character are required. From such a bit group the relevant bit for a combination of a row and a column number must be selected by selection in accordance with the counting positions of the row counter RC and the column counter CC. In FIG. 7 an example of a character generator ROM is shown. The reference RC denotes the row counter again, and CC denotes the column counter. The outputs $r=9$ of RC are connected, together with the outputs c of the column counter CC, to the inputs of AND-function gates Eij: row 1, column 1: E11; row 2, column 1: E12, . . . ; row 1, column 2: E21; row 2, column 2: E22; . . . row 1, column 3: E31; . . . row 1, column 9: E91, . . . ; and further the columns 10, 11, 12, 13 and 14 (space columns) all with row 1: E101; with row 2: E102, . . . ; with row 9: E109; the ROM in this case comprises a selection unit SER which receives character codes from BS. Each character has its own row: KT1, KT2, . . . These rows are the bit groups. The selection in a bit group is effected by the outputs of the described AND-function gates Eij: E11 finds the dot bit for row 1, column 1 of character KT1; E12 finds the dot bit for row 2 of column 1 of character TK1, etc. One dot bit after the other appears on the input of ROM for transport to OR-function gate d6. FIG. 8a furthermore shows the form of KT1. The same is shown for a part of character KT2. For the space part of each character a dot bit = 0 is given ($c=10, \ldots 14$, for each row 1–9): last bit position of ROM (extreme right in FIG. 7). In the embodiment shown in FIG. 7, it is also possible to store, in this example, 9×9=81 bits per character in the ROM (the last column in ROM can then be dispensed with); the outputs of E101, E102, ... , E109 must then be inverted, so that for each row a 0-dot bit appears for the column 10, 11 ... 14. These outputs can be connected to the output of the ROM, with the result that the 0-dot bits can be applied to gate d6.

In practice, of course, other constructions of the ROM are feasible, for example, incorporating a three-dimensional selection facility, so that each dot bit can be directly selected coming from three directions (BS, RC and CC). Furthermore, it is also possible that per column a bit group of each character can be selected. Such a bit group can then be stepwise scanned on the output of such a ROM by the row counter RC.

What is claimed is:

1. A control device for actuating recording elements in a recording device for recording characters composed of discrete elements, the recording device including a member which is reciprocatable in the line direction in front of a recording sheet, from one extreme position to another extreme position, the recording elements being arranged at a predetermined distance from each other and forming at least one group, comprising measuring means for supplying signals which indicate the movement, direction and the position of the reciprocatable member;

a buffer store for storing at least as many characters as there are to be recorded on the recording sheet during a single movement of the reciprocatable member;

addressing means for said buffer store;

a character generator for supplying character shape information;

a row counter having a first counting capacity for addressing the separate rows of elements constituting the characters in said character generator;

a column counter having a second counting capacity for addressing the separate columns constituting the characters in said character generator;

an element information register in which for each recording element the element information can be stored, and wherein the recording elements can be actuated in response to a control pulse;

means for performing recording actions during the movement of the movable member from the said other extreme position to the said one extreme position;

means for supplying the starting position device with an address code which corresponds to an address which indicates the number of character positions the last recording element, viewed from the other extreme position, situated from the $0^{th}$ character to be recorded on a line, said code being stored in the buffer store for supplying the starting position device; and means for ensuring that, in the other extreme position of the movable position of the movable member, the column counter is in its highest position, and that the column counter code can be decreased by 1 after each recording action.

2. A control device as defined in claim 1, further comprising means for decreasing the position of the starting position device by one address unit, each time in one of the positions of the column counter which corresponds to a column number in the space portion of a character, in total as many times as there are characters which are passed during the movement of the movable member from the said other extreme position to the said one extreme position.

3. A control device as claimed in claim 1, wherein the point-element or line-element information register is a shift register having parallel outputs and a serial input and output, a gate being provided whereby a flag signal can be applied to the input of the shift register before the first point-element or line-element information appears on the output of the character generator, a said calculation phase being stopped when the flag appears on the serial output of the shift register.

4. A control device for actuating recording elements in a recording device for recording characters composed of discrete elements, the recording device including a member which is reciprocable in the line direction in front of a recording sheet, from one extreme position to another extreme position, the recording elements being arranged at a predetermined distance from each other and forming at least one group, comprising measuring means for supplying signals which indicate the movement direction and the positions of the movable member;

a buffer store for the storage of at least as many characters as there are to be recorded on the recording sheet during a forward or return movement;

addressing means for the buffer store which can be preset by a starting position device;

a character generator for generating elements of point-shaped or line-shaped characters to be recorded;

a row counter having a counting capacity $r$ for addressing the separate rows of point elements or line elements constituting the characters in the character generator;

a column counter having a counting capacity 0 for addressing the separate columns constituting the characters in the character generator;

a point or line element information register in which for each recording element the point or line element information can be stored, and whereby the recording elements can be actuated in reaction to a control pulse;

first means in the one extreme position of the movable member, for supplying the starting position device with an address code which corresponds to an address which indicates the number of character positions whereby the first recording element precedes, viewed from the said one extreme position, the address of the buffer store in which the buffer store the first character to be recorded on a line is stored;

second means for transferring an address code from the starting position device to the addressing means of the buffer store;

third means for setting the row counter to a starting position, in the said extreme position, and for increasing the position of the circulating row counter by 1 each time, in total as many times as there are actuable recording elements, after which a recording action can be performed, these third means furthermore being provided for increasing, simultaneously with the increasing of the position of the row counter, the position of the addressing means for the store by each time a value of *s* addressing units, and for setting the column counter, in said extreme position, to a starting position, and for increasing the position of the column counter by 1 each time a recording action has been completed, in total a number of times equalling the counting capacity of 0 of the column counter; and fourth means for increasing the position of the starting position device by one address unit, each time in one of the positions of the column counter which corresponds to a column number in the space portion of a character, in total as many times as there are characters which are passed during the movement of the movable member from the one extreme position to the other extreme position.

5. The device as defined in claim 4, wherein at least some of said discrete elements are arranged on a line which encloses an acute angle with respect to said line direction of motion of said recording device.

* * * * *

UNITED STATES PATENT AND TRADEMARK OFFICE
CERTIFICATE OF CORRECTION

PATENT NO. : 4,024,506
DATED : May 17, 1977
INVENTOR(S) : HANS SPAARGAREN

It is certified that error appears in the above-identified patent and that said Letters Patent are hereby corrected as shown below:

```
Column  3, line 47, "S=s,r." should be --S=s.r.--
           line 49, "MPi MPO" should be --MPi (MPO--
Column  4, line 17, delete "is" (first occurrence)
           line 32, "measuring" should be --measuring means--
Column  6, line  5, "c-1=]13" should be --c-1=13--
           line  8, "black" should be --"black"--
           line 10, "black" should be --"black"--
           line 62, "constant" should be --instant--
Column  7, line 33, "co" should be --so--
Column  8, line 34, "sp" should be --so--
           line 54, "ca" should be --can--
Column 10, line 48, "flat" should be --flag--
Column 11, line 36, "0" should be --"0"--
Column 12, line 22, "0" should be --"0"--
           line 41, "dolumns" should be --columns--
           line 43, "purpose, so," should be --purpose. So,--
Claim 4, line 4, "reciprocable" should be --reciprocatable--
```

Signed and Sealed this

Twenty-seventh Day of September 1977

[SEAL]

Attest:

RUTH C. MASON
*Attesting Officer*

LUTRELLE F. PARKER
*Acting Commissioner of Patents and Trademarks*

UNITED STATES PATENT OFFICE
CERTIFICATE OF CORRECTION

Patent No. 4,024,506                    Dated May 17, 1977

Inventor(s) Hans Spaargaren

It is certified that error appears in the above-identified patent and that said Letters Patent are hereby corrected as shown below:

Claim 4, lines 26 and 60, "O" should read -- o --.

Signed and Sealed this

Thirtieth Day of May 1978

[SEAL]

Attest:

RUTH C. MASON  
Attesting Officer

LUTRELLE F. PARKER  
Acting Commissioner of Patents and Trademarks